(12) United States Patent
Park et al.

(10) Patent No.: US 9,313,807 B2
(45) Date of Patent: Apr. 12, 2016

(54) METHOD AND DEVICE FOR RANDOM ACCESS IN WIRELESS COMMUNICATION SYSTEM SUPPORTING MULTI-CARRIER WAVE

(75) Inventors: Sungjun Park, Gyeonggi-do (KR);
Sungduck Chun, Gyeonggi-do (KR);
Sunghoon Jung, Gyeonggi-do (KR);
Seungjune Yi, Gyeonggi-do (KR);
Youngdae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/237,202

(22) PCT Filed: Aug. 9, 2012

(86) PCT No.: PCT/KR2012/006340
§ 371 (c)(1),
(2), (4) Date: Feb. 5, 2014

(87) PCT Pub. No.: WO2013/022285
PCT Pub. Date: Feb. 14, 2013

(65) Prior Publication Data
US 2014/0169323 A1    Jun. 19, 2014

Related U.S. Application Data

(60) Provisional application No. 61/522,226, filed on Aug. 10, 2011.

(51) Int. Cl.
*H04W 72/08* (2009.01)
*H04W 74/08* (2009.01)
(Continued)

(52) U.S. Cl.
CPC ........ *H04W 74/0833* (2013.01); *H04W 72/042* (2013.01); *H04W 72/1289* (2013.01); *H04W 74/085* (2013.01); *H04L 1/1822* (2013.01);
(Continued)

(58) Field of Classification Search
None
See application file for complete search history.

(56) References Cited

U.S. PATENT DOCUMENTS 8,315,641 B2 * 11/2012 Chun et al. ............... 455/452.1
8,509,164 B2 *  8/2013 Park et al. .................. 370/329
(Continued)

FOREIGN PATENT DOCUMENTS

| EP | 2373113 A1 | 10/2011 |
|---|---|---|
| KR | 10-2011-0088588 A | 8/2011 |
| WO | 2010/143847 A2 | 12/2010 |

OTHER PUBLICATIONS

Lindoff et al., Random Access Procedures and Apparatus for Heterogeneous Networks, U.S. Appl. No. 61/498,357, filed Jun. 2011.*
(Continued)

*Primary Examiner* — Ian N Moore
*Assistant Examiner* — Justin T Van Roie
(74) *Attorney, Agent, or Firm* — Morgan, Lewis & Bockius LLP

(57) ABSTRACT

Provided are a method and device for random access in a wireless communication system supporting multi-carrier wave. The method includes: transmitting a random access preamble on the first secondary serving cell (SCell) to a base station, receiving a random access response from the base station, transmitting uplink data to the base station by using an uplink grant included in the random access response, and receiving a contention resolution message from the base station on the serving cell on which scheduling information on the first SCell is transmitted.

7 Claims, 13 Drawing Sheets

(51) Int. Cl.
  *H04W 72/12* (2009.01)
  *H04W 72/04* (2009.01)
  *H04W 74/00* (2009.01)
  *H04W 56/00* (2009.01)
  *H04L 1/18* (2006.01)

(52) U.S. Cl.
  CPC .......... *H04L1/1861* (2013.01); *H04W 56/0045* (2013.01); *H04W 74/002* (2013.01); *H04W 74/006* (2013.01)

(56) References Cited

U.S. PATENT DOCUMENTS

| | | | | |
|---|---|---|---|---|
| 8,588,834 | B2 * | 11/2013 | Lee et al. | 455/509 |
| 8,837,438 | B2 * | 9/2014 | Park et al. | 370/336 |
| 8,861,460 | B2 * | 10/2014 | Chun et al. | 370/329 |
| 2009/0232076 | A1 * | 9/2009 | Kuo | 370/329 |
| 2010/0232364 | A1 | 9/2010 | Hsu | |
| 2011/0045837 | A1 | 2/2011 | Kim et al. | |
| 2011/0261763 | A1 * | 10/2011 | Chun et al. | 370/329 |
| 2011/0292790 | A1 | 12/2011 | Iwamura et al. | |
| 2012/0076104 | A1 | 3/2012 | Chun et al. | |
| 2012/0287865 | A1 * | 11/2012 | Wu et al. | 370/329 |
| 2012/0300714 | A1 * | 11/2012 | Ng et al. | 370/329 |
| 2013/0028198 | A1 * | 1/2013 | Yamada | 370/329 |
| 2014/0112254 | A1 * | 4/2014 | Lindoff et al. | 370/328 |
| 2014/0112276 | A1 * | 4/2014 | Ahn et al. | 370/329 |
| 2014/0198748 | A1 * | 7/2014 | Lee et al. | 370/329 |
| 2014/0362803 | A1 * | 12/2014 | Chun et al. | 370/329 |

OTHER PUBLICATIONS

Ng et al., Random Access Procedures with Cross-Carrier Scheduling for LTE-Advanced Systems, U.S. Appl. No. 61/483,516, filed May 2011.*

3GPP TS 36.300 Version 10.3.0 Release 10 (Apr. 2011); Overall Description; Stage 2, pp. 71-72.*

Written Opinion and International Search Report issued in corresponding International Patent Application No. PCT/KR2012/006340 dated Jan. 23, 2013.

International Search Report issued in corresponding International Patent Application No. PCT/KR2012/006340 dated Jan. 23, 2013.

* cited by examiner

METHOD AND DEVICE FOR RANDOM ACCESS IN WIRELESS COMMUNICATION SYSTEM SUPPORTING MULTI-CARRIER WAVE

TECHNICAL FIELD

The present invention relates to a wireless communication system, and more particularly, to a method and device for performing a random access procedure in a wireless communication system that supports multiple carriers.

BACKGROUND ART

A general wireless communication system has considered only one carrier even though bandwidths between an uplink and a downlink are configured to be different from each other. For example, a wireless communication system of which uplink and downlink respectively have a single carrier and uplink bandwidth is generally symmetrical with a downlink bandwidth may be provided on the basis of a single carrier.

In order to obtain a broader bandwidth than that of the existing wireless communication system, the carrier aggregation technology, which groups a plurality of bandwidths in a frequency domain to obtain the same advantage as that obtained by a logically great bandwidth, may be used. In a system that supports carrier aggregation, a cell may be understood by combination of downlink resources and uplink resources. In a wireless communication system which is currently defined, the uplink resources are not required essentially in defining a cell. Accordingly, the cell may be comprised of either the downlink resources only or combination of the downlink resources and the uplink resources. The downlink resources may be referred to as downlink component carriers (DL CC), and the uplink resources may be referred to as uplink component carriers (UL CC). The DL CC and the UL CC may be expressed as carrier frequency that means center frequency in the corresponding cell.

Also, the cell may be classified into a primary cell (PCell) operated on a primary frequency and a secondary cell (SCell) operated on a secondary frequency. The PCell and the SCell may be referred to as serving cells. In brief, the PCell is a core cell related to control in a carrier aggregation condition, and the other serving cells except for the PCell may be the SCells.

DISCLOSURE

Technical Problem

A user equipment may perform a random access procedure either to acquire an uplink transmission timing alignment value or for other various purposes. In a carrier aggregation system, a non-contention based random access procedure that uses previously allocated resources is performed on the SCell. However, if a plurality of user equipments perform a non-contention based random access procedure, resources allocated to each user equipment may be insufficient, and acquisition of an uplink transmission timing alignment value of the user equipment may be delayed. Accordingly, it is required that a contention based random access procedure should be supported even on the SCell.

An object of the present invention devised to solve the conventional problem is to provide a method and device for efficiently performing a contention based random access procedure on SCell.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the above technical problems, in one aspect of the present invention, a method for performing a random access procedure on a first secondary serving cell (SCell) in a user equipment configured with a plurality of serving cells comprises transmitting a random access preamble on the first SCell to a base station; receiving a random access response from the base station; transmitting uplink data to the base station by using an uplink grant included in the random access response; and receiving a contention resolution message from the base station on the serving cell on which scheduling information on the first SCell is transmitted.

To solve the above technical problems, in another aspect of the present invention, a user equipment for performing a random access procedure on a first secondary serving cell (SCell) comprises a reception module configured to receive a downlink signal from a base station; a transmission module configured to transmit an uplink signal to the base station; and a processor configured to control the user equipment that includes the reception module and the transmission module, wherein a plurality of serving cells are configured for the user equipment, and wherein the processor is configured to transmit a random access preamble on the first SCell to a base station through the transmission module, receive a random access response from the base station through the reception module, transmit uplink data to the base station by using an uplink grant included in the random access response through the transmission module, and receive a contention resolution message from the base station on the serving cell on which scheduling information on the first SCell is transmitted, through the reception module.

The followings may commonly be applied to the above aspects of the present invention.

The user equipment may consider that contention resolution is successful only if physical downlink control channel (PDCCH) transmission is received on the serving cell on which the scheduling information on the first SCell is transmitted.

The user equipment may consider that contention resolution is not successful if PDCCH transmission is received on a serving cell except for the serving cell on which the scheduling information on the first SCell is transmitted.

The serving cell on which the scheduling information on the first SCell is transmitted may be the first SCell.

The serving cell on which the scheduling information on the first SCell is transmitted may be another serving cell.

The another serving cell may be a primary serving cell PCell or a second SCell.

The PDCCH transmission may be addressed by an identifier of the user equipment.

An identifier of the user equipment may be a cell-radio network temporary identifier (C-RNTI) or a temporary C-RNTI.

The PDCCH transmission may include uplink grant.

The user equipment may initiate a contention resolution timer if the uplink data are transmitted.

The contention resolution message may be received before the contention resolution timer expires.

The user equipment that has received the contention resolution message may consider that the random access procedure is successful.

The first SCell may belong to a timing advance group (TAG) that includes SCells only.

The aforementioned general description of the present invention and the following detailed description are only exemplary, and are intended for additional description of the claims.

Advantageous Effects

According to the present invention, the method and device for efficiently performing a contention based random access procedure on SCell may be provided.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
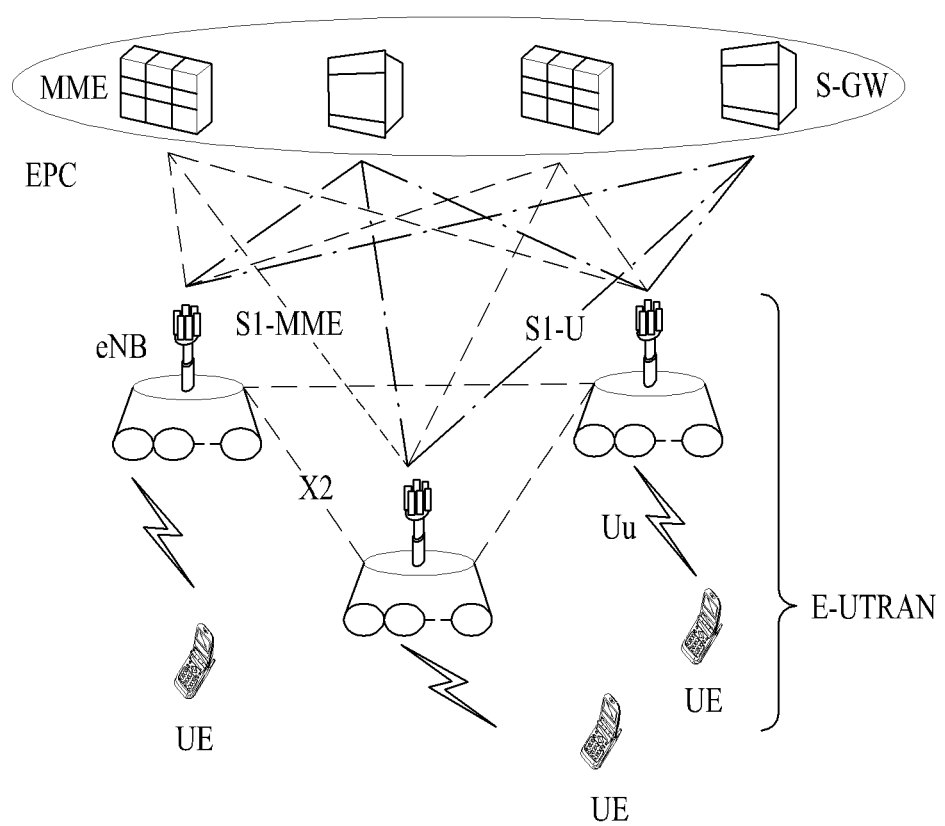
FIG. 1 is a diagram illustrating a structure of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Structure of LTE System

A structure of an LTE system which is an example of a wireless communication system to which the present invention may be applied will be described with reference to FIG. 1. The LTE system is a mobile communication system evolved from the UMTS. As shown in FIG. 1, the LTE system may be divided into E-UTRAN (Evolved UMTS Terrestrial Radio Access Network) and EPC (Evolved Packet Core). The E-UTRAN includes a user equipment UE and eNB (Evolved NodeB, base station). An interface between the UE and the eNB may be referred to as Uu interface, and an interface between eNBs may be referred to as X2 interface. The EPC includes a mobility management entity (MME) and a serving-gateway (S-GW), wherein the MME serves as a control plane and the serving gateway serves as a user plane. An interface between the eNB and the MME may be referred to as S1-MME interface, and an interface between the eNB and the S-SG may be referred to as S1-U interface. The S1-MME interface and the S1-U interface may be referred to as S1 interface.

Figure 2:
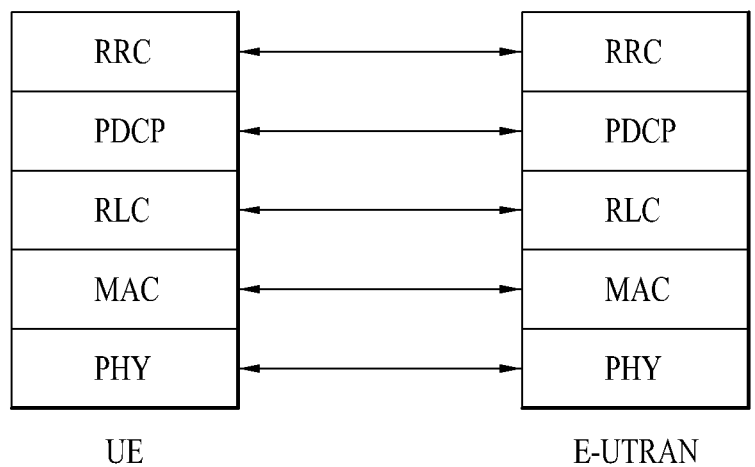
FIG. 2 is a diagram illustrating a control plane of a radio protocol.
Figure 3:
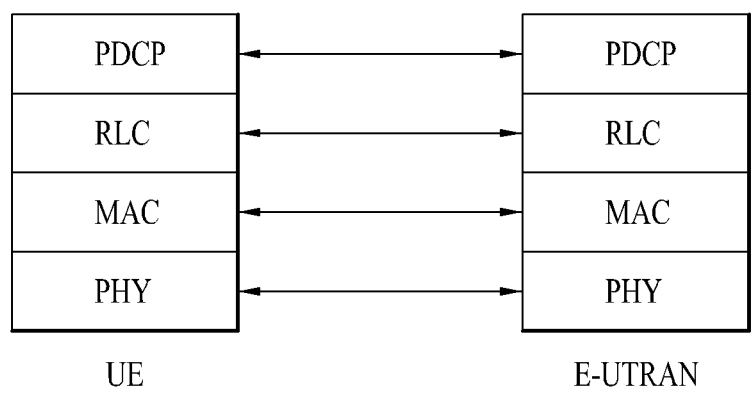
FIG. 3 is a diagram illustrating a user plane of a radio protocol.

A radio interface protocol is defined in the Uu interface which is a radio interval, and horizontally includes a physical layer, a data link layer, and a network layer, and vertically includes a user plane for data information transfer and a control plane for signaling transfer (control signal transfer). As shown in FIG. 2 and FIG. 3, the radio interface protocol may be classified into L1 (first layer) including a physical (PHY) layer, L2 (second layer) including MAC/RLC/PDCP (medium access control/radio link control/protocol data convergence protocol) layers, and L3 (third layer) including RRC layer, based on three lower layers of the open system interconnection (OSI) standard model widely known in the communications systems. These radio protocol layers exist in the user equipment UE and the E-UTRAN in pairs, and play a role in data transfer of the Uu interface.

Each layer of radio protocols shown in FIG. 2 and FIG. 3 will be described as follows. FIG. 2 is a diagram illustrating a control plane of a radio protocol, and FIG. 3 is a diagram illustrating a user plane of a radio protocol.

The physical (PHY) layer belonging to the first layer L1 provides an information transfer service using a physical channel. The PHY layer is connected to a medium access control (MAC) layer above the physical layer via a transport channel. Data are transferred between the medium access control layer and the physical layer via the transport channel. At this time, the transport channel is divided into a dedicated transport channel and a common transport channel depending on channel sharing. Data are transferred between one physical layer of a transmitting side and the other physical layer of a receiving side through the physical channel.

Several layers exist in the second layer. First of all, the MAC layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval. Also, the RLC layer of the second layer provides three action modes, i.e., a transparent mode (TM), an un-acknowledged mode (UM), and an acknowledged mode (AM) to ensure various quality of services (QoS) required by each radio bearer (RB). In particular, the AM RLC layer performs a retransmission function through automatic repeat and request (ARQ) function for reliable data transmission.

In order to effectively transmit data using IP packets such as IPv4 or IPv6 within a radio-communication interval having a narrow bandwidth, a PDCP (packet data convergence protocol) layer of the second layer performs header compression to reduce the size of IP packet header having relatively great size and unnecessary control information. The header compression is to increase transmission efficiency of the radio-communication interval by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, reconfiguration and release of radio bearers (RBs) to be in charge of controlling the logical, transport and physical channels. In this case, the RB means a service or logical path provided by the first and second layers of the radio protocol for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a passageway for transmitting RRC message in the control plane, and the DRB is used as a passageway for transmitting user data in the user plane.

Carrier Aggregation

Figure 4:
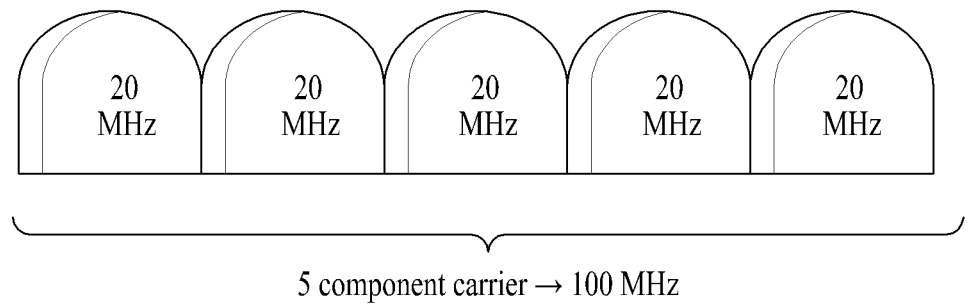
FIG. 4 is a diagram illustrating carrier aggregation.

The carrier aggregation technology that supports multiple carriers will be described with reference to FIG. 4.

As described above, the carrier aggregation technology may support a system bandwidth of maximum 100 MHz by grouping five component carriers (CCs) of a bandwidth unit (for example, 20 MHz) defined in the existing wireless communication system (for example, LTE system). The component carriers used for carrier aggregation may have the same size or different sizes. Also, the respective component carriers have their own frequency bands (or center frequency) different from each other. Also, although the respective component carriers may exist on a continuous frequency band, the component carriers existing on a discontinuous frequency band may be used for carrier aggregation. Also, in the carrier aggregation technology, a bandwidth of the uplink and a bandwidth of the downlink may be allocated symmetrically or asymmetrically to each other. Also, a serving cell of the LTE-A system may include one downlink CC and one uplink CC, or may include one downlink CC. However, one cell may include one uplink resource only in an advanced or another wireless communication system without limitation to the above example.

If the carrier aggregation technology is used, only one RRC connection exists between the user equipment and the base station. A plurality of serving cells configured to be used by the user equipment may be classified into PCell and SCell. The PCell may correspond to the serving cell that provides security input (for example, ECGI (E-UTRAN Cell Global Identifier), PCI (Physical Cell Identifier), ARFCN (Absolute Radio-Frequency Channel Number)) for establishment and re-establishment of RRC connection and mobility information (for example, TAI (tracking area identity)) of a non access stratum (NAS). The SCell may correspond to the other cells except for the PCell.

In configuring the plurality of serving cells, the PCell is always available, whereas the SCells may be added and released by the base station if necessary. After the SCells are added, the SCells may be used dynamically in accordance with activation/deactivation.

Figure 5:
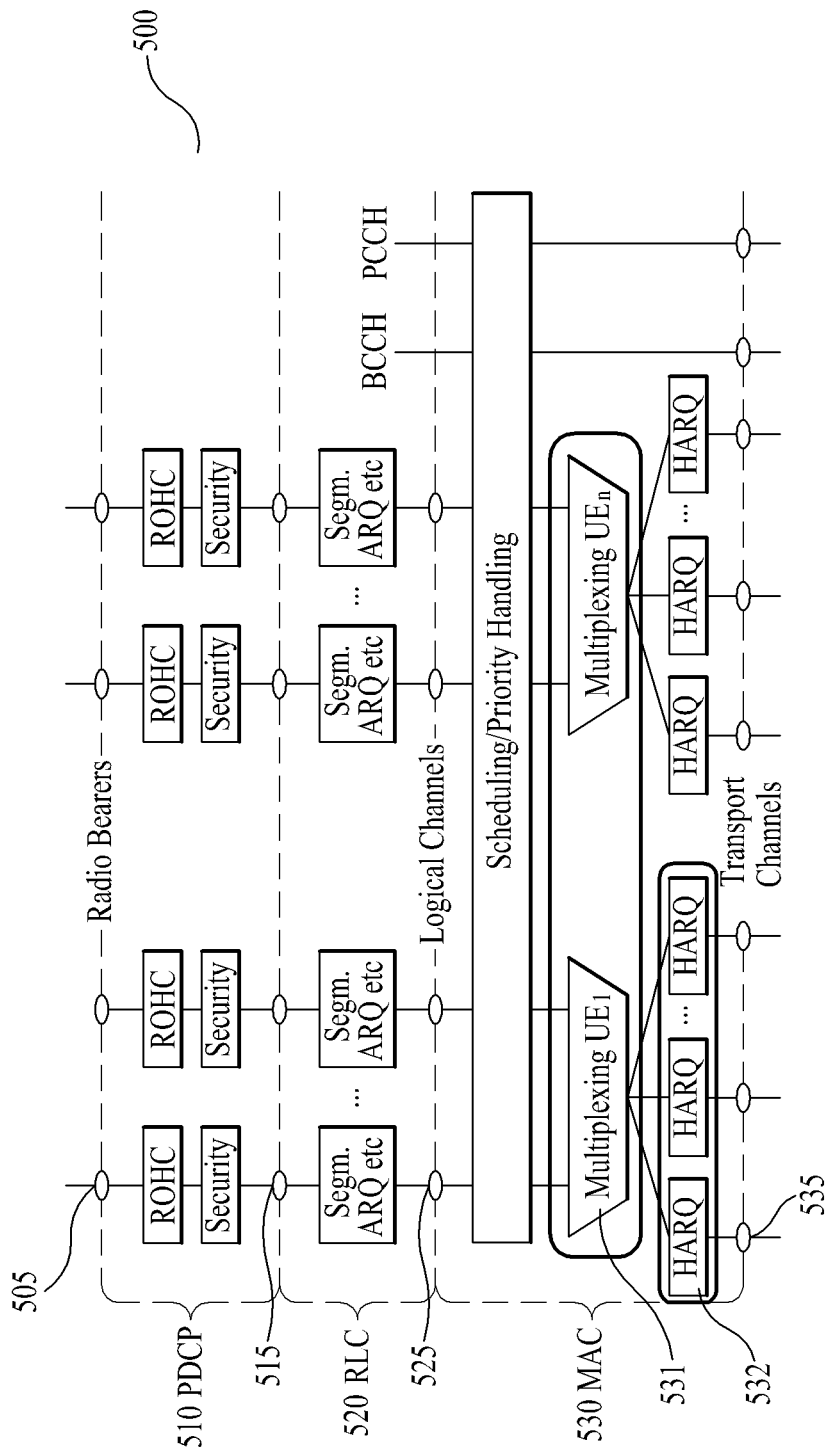
FIG. 5 is a diagram illustrating a structure of a downlink L2 (second layer) in carrier aggregation.
Figure 6:
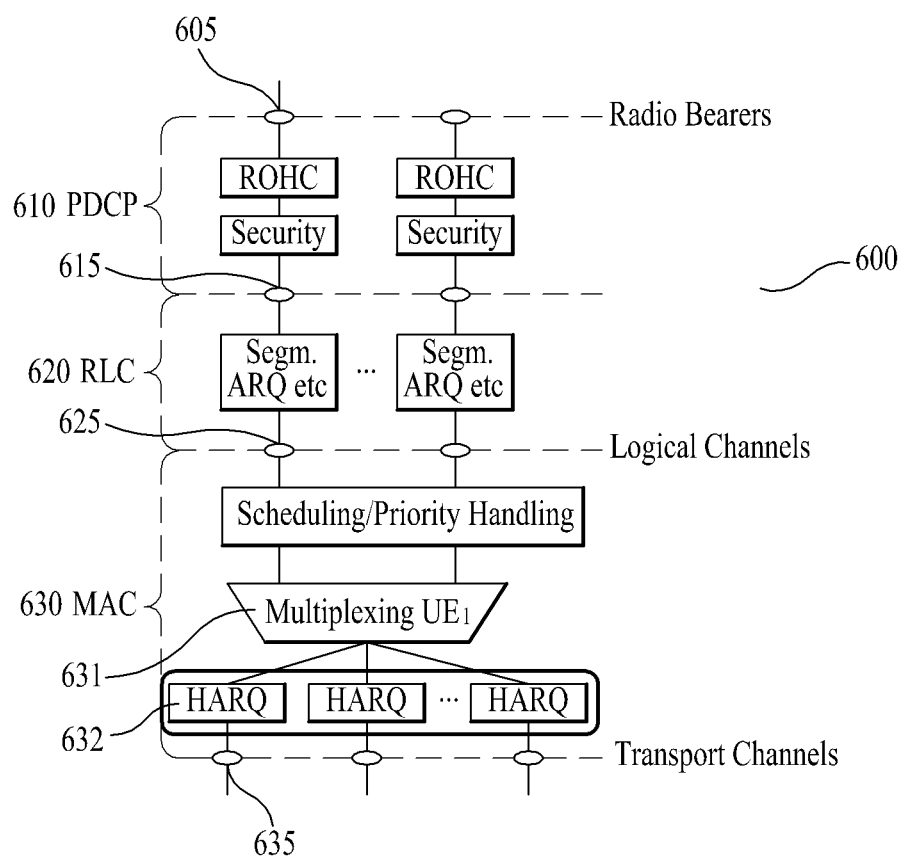
FIG. 6 is a diagram illustrating a structure of an uplink L2 (second layer) in carrier aggregation.

A structure L2 (second layer) considering the carrier aggregation technology will be described with reference to FIGS. 5 and 6. FIG. 5 is a diagram illustrating a structure of downlink L2 (second layer) in carrier aggregation, and FIG. 6 is a diagram illustrating a structure of uplink L2 (second layer) in carrier aggregation.

In a downlink L2 structure 500 of FIG. 5, a PDCP layer 510, an RLC layer 520 and a MAC layer 530 are shown. In FIG. 5, elements 505, 515, 525 and 535 marked with circles in an interface between the respective layers represent service access points (SAP) for peer-to-peer communication. The SAP between a PHY channel (not shown) and the MAC layer provides a transport channel (535), and the SAP between the MAC layer and the RLC layer provides a logical channel (525). A general operation of each layer has been described above.

The MAC layer multiplexes a plurality of logical channels (that is, radio bearers) from the RLC layer. In the downlink L2 structure, a plurality of multiplexing entities 531 of the MAC layer are related to application of the multiple input multiple output (MIMO) technology. In a system that does not consider the carrier aggregation technology, since one transport channel is generated by multiplexing a plurality of logical channels in case of non-MIMO, one hybrid automatic repeat and request (HARQ) entity is provided to one multiplexing entity 531 (not shown).

In the meantime, in a system that considers the carrier aggregation technology, a plurality of transport channels corresponding to a plurality of component carriers are generated from one multiplexing entity 531. In this regard, in the carrier aggregation technology, one HARQ entity 532 manages one component carrier. Accordingly, the MAC layer 530 of the system that supports the carrier aggregation technology provides a plurality of HARQ entities 532 to one multiplexing entity 531. Also, since the respective HARQ entities 532 process a transport block independently, they may transmit and receive a plurality transport blocks through a plurality of component carriers at the same time.

In an uplink structure 600 of FIG. 6, the same operation as that of the downlink L2 structure 500 of FIG. 5 is performed except that one multiplexing entity 631 is included in one MAC layer 630. In other words, a plurality of HARQ entities 632 may be provided for a plurality of component carriers, the operations related to the plurality of HARQ entities 632 may be performed by the MAC layer 630, and the plurality of transport blocks may be transmitted and received through the plurality of component carriers at the same time.

Figure 7:
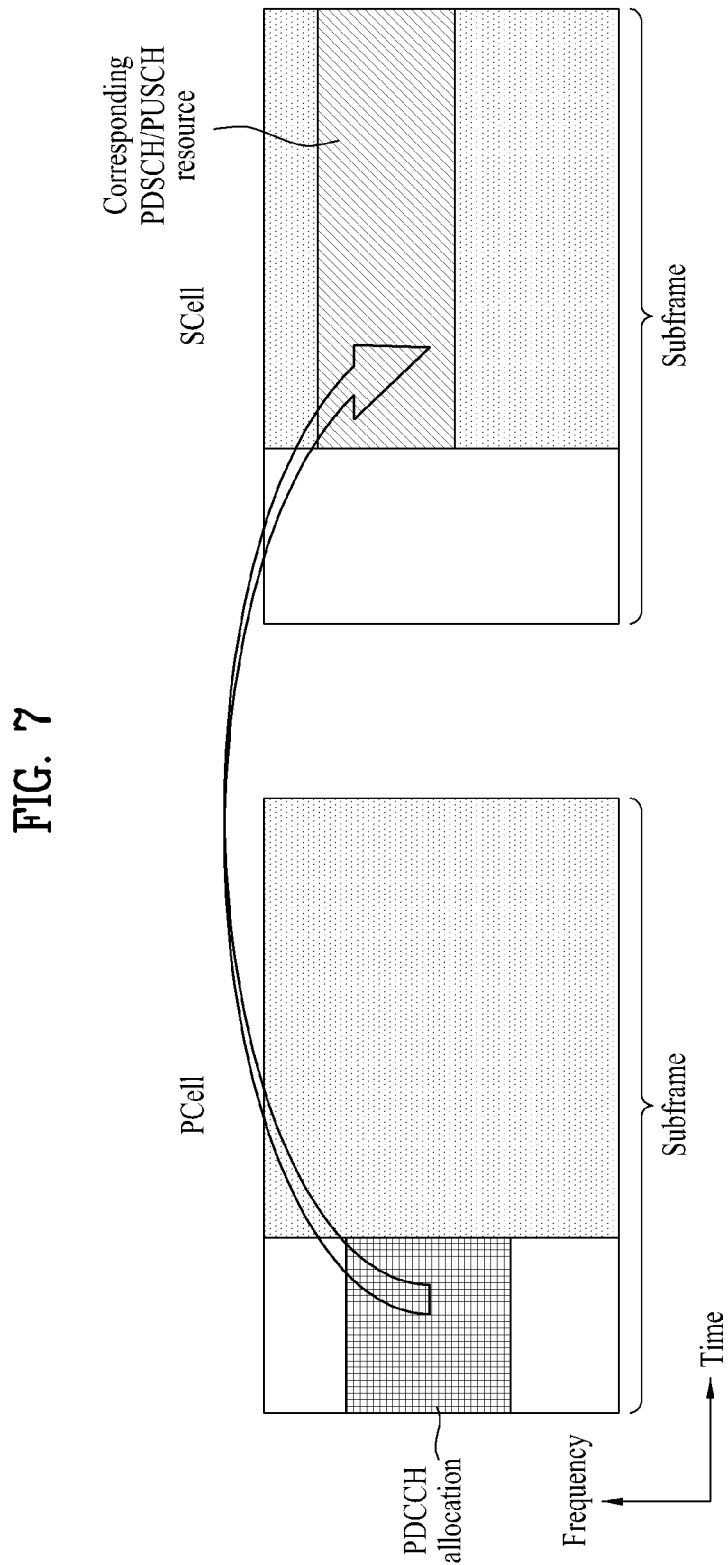
FIG. 7 is a diagram illustrating cross carrier scheduling.

FIG. 7 is a diagram illustrating cross carrier scheduling.

If the base station configures a plurality of serving cells for the user equipment in the system that supports carrier aggregation, non-cross carrier scheduling may be considered as a basic scheduling scheme for enabling the user equipment to transmit/receive uplink data or downlink data. In other words, on the same serving cell as a serving cell where downlink data reception through a physical downlink shared channel (PDSCH) or uplink data transmission through a physical uplink shared channel (PUSCH) is performed, scheduling control information is provided to the user equipment by using a physical downlink control channel (PDCCH). For example, if the base station configures a serving cell A and a serving cell B, control information scheduled to allow the user equipment to transmit downlink data through the PDSCH on the serving cell A may be provided to the user equipment through the PDCCH on the serving cell A, and control information scheduled to allow the user equipment to transmit uplink data through the PUSCH on the serving cell B may be provided to the user equipment through the PDCCH on the serving cell B.

In the meantime, cross carrier scheduling means that the control information for scheduling uplink/downlink transmission/reception on a serving cell is provided on another serving cell not the corresponding serving cell. FIG. 7 illustrates an example of cross carrier scheduling. For example, if two serving cells (PCell and SCell) are configured for the user equipment, it is assumed that one serving cell (for example, PCell) is a macro cell and the other serving cell (for example, SCell) is a small cell that uses the same frequency as that of the macro cell within coverage of the macro cell. In this case, if inter-cell interference adjustment is used, although data transmission and reception in each serving cell is performed normally, it may be difficult to control inter-cell interference in a PDCCH transmission area. For example, if the PCell is a macro cell and the SCell is a small cell, a PDCCH receiving rate of the user equipment on the SCell is low but data transmission and reception may be performed. In this case, control information for scheduling data transmission and reception on the SCell may be transmitted to the user equipment through the PDCCH on the PCell, whereby the user equipment may transmit or receive data through the PDSCH/PUSCH on the SCell. If cross carrier scheduling described as above is used, scheduling control information transmitted through the PDCCH on the PCell may include an identifier (for example, cell index field (CIF)) of the scheduled cell (for example, SCell).

Random Access Procedure

Hereinafter, a random access procedure performed by the LTE system and a random access procedure in the system to which the carrier aggregation technology is applied will be described in more detail.

In the LTE system, the user equipment may perform the random access procedure in case of the following events:
  in the event that the user equipment performs initial access due to no RRC connection with the base station;
  in the event that the user equipment initially accesses a target cell during a handover procedure;
  in the event that the random access procedure is requested by a command of the base station;
  in the event that uplink data occur in a state that uplink time advance is not synchronized or a designated radio resource is not allocated; and
  in the event that a recovery procedure is performed during radio link failure (RLF) or handover failure.

In the LTE system, the base station allocates a random access preamble dedicated for a specific user equipment, and the user equipment provides a non-contention based random access procedure for performing the random access procedure by using the random access preamble. In other words, the random access procedure is divided into a contention based random access procedure and a non-contention based random access procedure in accordance with a procedure of selecting the random access preamble. In the contention based random access procedure, the user equipment randomly selects one of a set of random access preambles and uses the selected one. In the non-contention based random access procedure, a random access preamble allocated from the base station to the specific user equipment only is used. The contention based random access procedure is different from the non-contention based random access procedure in occurrence of contention. The non-contention based random access procedure may be used only in case of request based on the handover procedure or the command of the base station.

Figure 8:
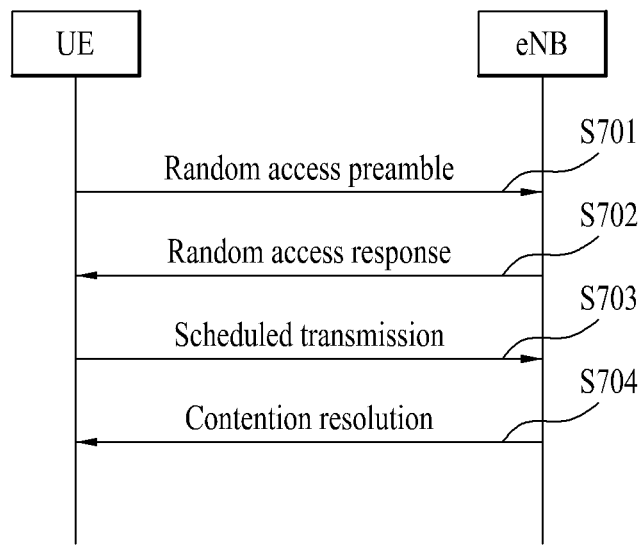
FIG. 8 is a diagram illustrating an operation procedure of a user equipment and a base station in a contention based random access procedure.

FIG. 8 is a diagram illustrating an operation procedure of a user equipment and a base station in a contention based random access procedure.

(1) Transmission of First Message (Msg1)

First of all, the user equipment may randomly select one random access preamble from a set of random access preambles indicated through system information or handover command, and may select a physical random access channel (PRACH), through which the random access preamble may be transmitted, and transmit the selected one (S701).

(2) Reception of Second Message (Msg2)

After transmitting the random access preamble at the step S501, the user equipment tries to receive its random access response within a random access receiving window indicated by the base station through the system information or handover command (S702). In more detail, the random access response information may be transmitted in the form of MAC PDU (packet data unit). The MAC PDU may be transferred through a physical downlink shared channel (PDSCH). Also, in order to appropriately receive the information transferred through the PDSCH, it is preferable that the user equipment monitors a physical downlink control channel (PDCCH). In other words, it is preferable that the PDCCH includes information of the user equipment, which should receive the PDSCH, frequency and time information of a radio resource of the PDSCH, and a transmission format of the PDSCH. Once the user equipment receives the PDCCH successfully, the user equipment may appropriately receive the random access response transmitted through the PDSCH in accordance with the information of the PDCCH. The random access response may include a random access preamble identifier (ID) (RAPID), uplink (UL) grant indicating uplink radio resources, a temporary cell identifier (temporary C-RNTI (Cell-Radio Network Temporary Identifier), and time advance commands (TACs).

As described above, since random access response information for one or more user equipments may be included in one random access response, the random access preamble identifier is required for random access response to indicate a user equipment for which the UL grant, the temporary cell identifier and the TAC are valid. In this case, it is assumed that the user equipment selects a random access preamble identifier identical with the random access preamble selected by itself at the step S702.

(3) Transmission of Third Message (Msg3)

If the user equipment receives a random access response valid for itself, the user equipment processes each of various kinds of the information included in the random access preamble. In other words, the user equipment applies TAC and stores a temporary cell identifier. Also, the user equipment may store data, which will be transmitted in response to reception of the valid random access response, in a buffer.

In the meantime, the user equipment transmits data (that is, third message) to the base station by using the received UL grant (S703). The third message should include the identifier of the user equipment. In case of the content based random access procedure, the base station cannot determine user equipments that perform the random access procedure. This is because that the base station should identify the user equipment to resolve contention later.

Two methods of including the identifier of the user equipment in the third message exist. The first method is that the user equipment having a valid cell identifier allocated from a corresponding cell before the random access procedure transmits its cell identifier through an uplink transmission signal corresponding to the UL grant. On the other hand, the user equipment which is not allocated with a valid cell identifier before the random access procedure transmits its unique identifier (for example, S-TMSI or random ID). Generally, the unique identifier is longer than the cell identifier. The user equipment which has transmitted the data corresponding to the UL grant initiates a contention resolution timer (hereinafter, referred to as "CR timer").

(4) Reception of Fourth Message (Msg4)

The user equipment which has transmitted the data including its identifier to the base station through the UL grant included in the random access response waits for a command of the base station to resolve contention. In other words, the user equipment tries to receive the PDCCH to receive a specific message from the base station (S704). Two methods of receiving the PDCCH exist. As described above, if the identifier of the user equipment, which is included in the third message transmitted to correspond to the UL grant, is the cell identifier, the user equipment tries to receive the PDCCH by using its cell identifier. If the identifier of the user equipment is the unique identifier, the user equipment may try to receive the PDCCH by using the temporary cell identifier included in the random access response. Afterwards, in case of the former case, if the PDCCH is received through the cell identifier of the user equipment before the CR timer expires, the user equipment determines that the random access procedure has been performed normally, and ends the random access procedure. In case of the latter case, if the PDCCH is received through the temporary cell identifier before the CR timer expires, the user equipment identifies the data carried by the PDSCH indicated by the PDCCH. If the unique identifier of the user equipment is included in the data carried by the PDSCH, the user equipment determines that the random access procedure has been performed normally, and ends the random access procedure.

Figure 9:
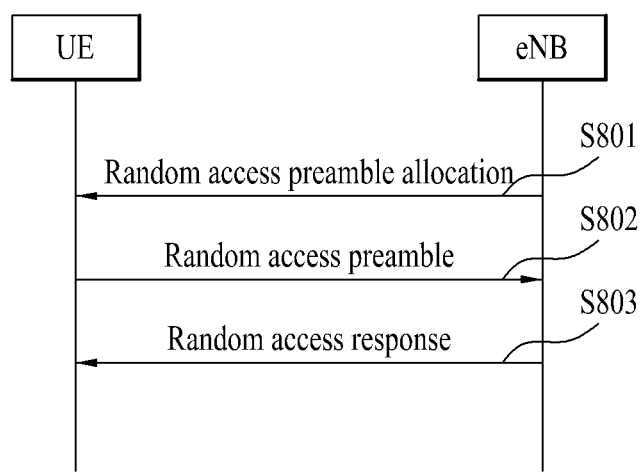
FIG. 9 is a diagram illustrating an operation procedure of a user equipment and a base station in a non-contention based random access procedure.

FIG. 9 is a diagram illustrating an operation procedure of a user equipment and a base station in a non-contention based random access procedure.

Unlike the contention based random access procedure shown in FIG. 8, in the operation in the non-contention based random access procedure, the random access procedure ends by means of transmission of the first message and the second message. However, before the user equipment transmits the random access preamble to the base station as the first message, the user equipment is allocated with the random access preamble from the base station, and transmits the allocated random access preamble to the base station as the first message and receives the random access response from the base station, whereby the random access procedure ends.

The non-contention based random access procedure may be performed in case of a handover procedure or a request based on the command of the base station. Of course, the contention based random access procedure may be performed in case of these two cases.

(1) Allocation of random access preamble

For the non-contention based random access procedure, the user equipment is allocated with a dedicated random access preamble having no possibility of contention from the base station. The user equipment may be commanded the random access preamble from the base station through a handover command or a PDCCH command.

(2) The user equipment transmits its dedicated random access preamble, which is allocated from the base station, to the base station as the first message.

(3) The method of receiving the random access response information from the base station is the same as that in the contention based random access procedure.

Timing Alignment Maintenance

In the LTE system based on the orthogonal frequency division multiplex (OFDM) technology, communication between a user (or user equipment UE) and a base station may interfere with communication of the other users. In order to minimize such interference, it is important that the base station manages transmission timing of the user equipment. In more detail, the user equipment may exist in a random area within a cell, and the time required for data transmitted from the user equipment to reach the base station may be varied depending on the location of each user equipment. In other words, the time required for the signal transmitted from the user equipment located at the edge of the cell to reach the base station will relatively be longer than the time required for the signal transmitted from the user equipment located at the center of the cell to reach the base station. On the other hand, the time required for the signal transmitted from the user equipment located at the center of the cell to reach the base station will relatively be shorter than the time required for the signal transmitted from the user equipment located at the center of the cell to reach the base station. The base station may properly perform scheduling for each user equipment by managing transmission timing of the user equipment to allow the signals transmitted from all the user equipments within the cell to reach the base station at the same time (or within a predetermined time boundary), whereby interference between the user equipments may be minimized. For example, the base station may manage transmission timing of each user equipment to receive uplink signals from the respective user equipments at the same timing by relatively more advancing uplink transmission timing of the user equipment located at the edge of the cell than a predetermined reference and relatively less advancing uplink transmission timing of the user equipment located at the center of the cell than the predetermined reference. This operation may be referred to as timing alignment maintenance operation or timing advance operation.

The random access operation is one method for managing timing advance. In other words, the base station may receive a random access preamble from the user equipment through the random access procedure, and may calculate a timing advance value for making transmission timing of the user equipment fast or slow by using the received information of the random access preamble. The base station may notify the user equipment of the calculated timing advance value through the random access response, and the user equipment may update its transmission timing by using the timing advance value.

As another method, the base station may receive a sounding reference signal (SRS) from the user equipment periodically or randomly, and may calculate the timing advance value of the user equipment through the received signal and notify the user equipment of the calculated timing advance value. As a result, the user equipment may update its transmission timing.

As described above, the base station may measure the transmission timing of the user equipment through the random access preamble or the SRS, and may calculate a timing value to be corrected and then notify the user equipment of the calculated timing value. In this way, the timing advance value transmitted from the base station to the user equipment, that is, the timing value to be corrected, may be referred to as timing advance command (TAC). Also, the TAC is processed by the MAC layer. Also, since the user equipment is not always located at the fixed location, the transmission timing of the user equipment is varied depending on the moving speed and location of the user equipment. In this respect, the user equipment should assume that the TAC is valid for a specific time not an infinite time once the TAC is received from the base station. To this end, a time alignment timer (TAT) is used. In other words, once the TAC is received from the base station, the user equipment initiates the TAT, and assumes that timing alignment with the base station is correct during only the operation of the TAT. The TAT value may be transferred through RRC signal such as system information or radio bearer reconfiguration. Also, if a new TAC is received from the base station during the operation of the TAT, the user equipment resumes the TAT. When the TAT expires or the TAT is not operated, the user equipment assumes that timing alignment with the base station is not correct, and does not perform any uplink data transmission or control signal transmission (for example, data transmission based on PUSCH or control signal transmission based on PUCCH) except for transmission of the random access preamble.

A Plurality of Timing Advances

In the system that supports carrier aggregation, a plurality of timing advances may be applied to one user equipment. If a plurality of serving cells are configured for the user equipment, since the respective serving cells may have their respective frequency features different from each other, a plurality of timing alignment maintenances are required. If uplink transmission is tried on the plurality of serving cells in a state that transmission timing is not synchronized, inter-cell interference may occur. In the same manner as that timing alignment is managed per user to reduce interference between the users in the LTE system, it is required in the carrier aggregation system that uplink transmission timing of each serving cell having uplink CC should be adjusted properly to reduce inter-cell interference.

If the plurality of serving cells are configured for the user equipment, the serving cells having similar timing alignment features may exist depending on frequency features of the plurality of serving cells. For example, the serving cells within same frequency band may have similar timing alignment features. In this case, it is preferable to perform timing alignment maintenance per group by grouping the serving cells having similar timing alignment features instead of performing timing alignment maintenance per serving cell. For timing alignment, one or more serving cells may constitute one group. In this case, the group may be referred to as a timing advance group (TAG).

The base station may notify the user equipment of information on a TAG, in which each serving cell is included, through TAG identifier of the RRC signal. One user equipment may two or more TAGs, each of which may include one or more serving cells having similar uplink timing alignment features. If a plurality of serving cells are included in one TAG, at least one of the serving cells should have uplink resource (or uplink CC).

The following Table 1 illustrates a part of scenarios to which the carrier aggregation technology may be applied. In the scenarios described in Table 1, two serving cells may be referred to as F1 and F2, which may be understood as the center frequencies of the respective serving cells. Also, in the scenarios of the following Table 1, it is assumed that F1<F2.

TABLE 1

Figure 10:
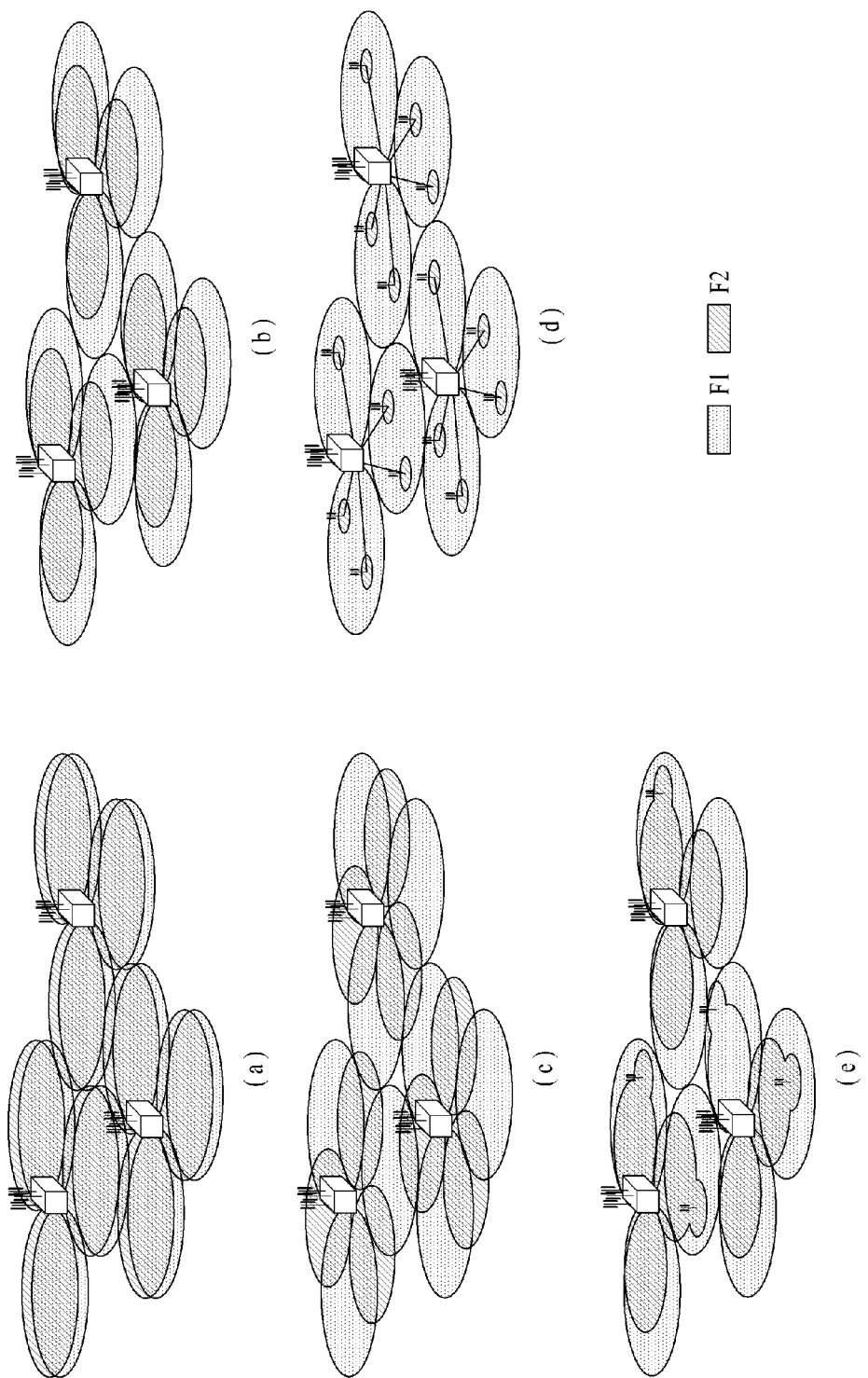
FIG. 10 is a diagram illustrating examples of an arrangement scenario of a carrier aggregation system.

| Scenario | Description | Example |
|---|---|---|
| 1 | F1 and F2 are overlaid at the same location, and provide almost same coverage. Both two cells provide sufficient coverage, and mobility of a user may be supported by both two cells. Scenario 1 may correspond to a case where F1 and F2 exist at the same frequency bandwidth (for example, bandwidth of 2 GHz or bandwidth of 800 MHz, etc.). Carrier aggregation may be performed between overlaid cells F1 and F2. | FIG. 10(a) |
| 2 | Although F1 and F2 are overlaid at the same location, F2 has small coverage due to great path loss. F1 only provides sufficient coverage, and F2 may be used to improve throughput. Mobility of a user may be supported on the basis of coverage of F1. Scenario 2 may correspond to a case where F1 and F2 exist at different frequency bandwidths (for example, F1 exists at bandwidth of 800 MHz or bandwidth of 2 GHz, and F2 exists at bandwidth of 3.5 GHz). Carrier aggregation may be performed between overlaid cells F1 and F2. | FIG. 10(b) |
| 3 | Although F1 and F2 are overlaid at the same location, an antenna of F2 is configured towards the edge of the cell, whereby throughput of the cell may be improved. Although F1 provides sufficient coverage, F2 may have a potential hole due to great path loss, for example. Mobility of a user may be supported on the basis of coverage of F1. Scenario 3 may correspond to a case where F1 and F2 exist at different frequency bandwidths (for example, F1 exists at bandwidth of 800 MHz or bandwidth of 2 GHz, and F2 exists at bandwidth of 3.5 GHz). F1 and F2 of the same base station may be aggregated at the overlaid location of coverage. | FIG. 10(c) |
| 4 | F1 provides macro coverage, and F2 may correspond to remote radio head (RRH) used to increase throughput at a hot spot. Mobility of a user is supported on the basis of coverage of F1. Scenario 4 may correspond to a case where F1 and F2 exist at different frequency bandwidths (for example, F1 exists at bandwidth of 800 MHz or bandwidth of 2 GHz, and F2 exists at bandwidth of 3.5 GHz). F2 RRH cells may be aggregated with F1 macro cells. | FIG. 10(d) |
| 5 | Although scenario 5 is similar to scenario 2, the scenario 5 corresponds to a case where a frequency selective relay is arranged and thus coverage is extended for one of carrier frequencies. F1 and F2 of the same base station may be aggregated at the overlaid location of coverage. | FIG. 10(e) |

In the examples of the above Table 1, since frequency features of the plurality of serving cells are similar to one another in the scenario 1, it is preferable that the serving cells belong to one TAG and one timing advance is applied to the user equipment. Since frequency features of the plurality of serving cells are different from one another in the scenarios 2, 3, 4 and 5, it is preferable that the serving cells belong to their respective TAGs different from one another and a plurality of timing advances are applied to the user equipment.

Hereinafter, a method for managing timing alignment per TAG will be described.

If the TAC is received from the base station, the user equipment initiates the TAT, and it is assumed that timing alignment of the user equipment is synchronized with timing alignment of the base station during only the operation of the TAT. In the carrier aggregation system, if a plurality of TAGs are configured for the user equipment, the user equipment manages timing alignment per TAG, whereby the TAT is operated per TAG. In other words, the same timing advance value is applied to all the serving cells within the same TAG, and if the TAT expires, the serving cell(s) of the corresponding TAG cannot perform any uplink transmission except for the random access preamble.

Figure 11:
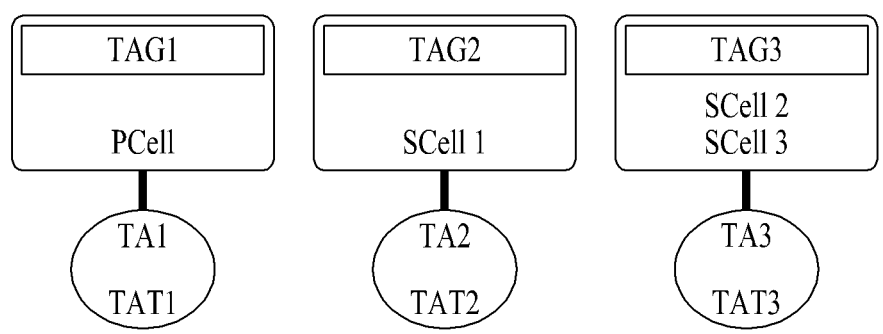
FIG. 11 is a diagram illustrating a timing advance operation based on a timing advance group (TAG)

FIG. 11 is a diagram illustrating a timing advance operation based on a timing advance group (TAG).

In the example of FIG. 11, it is assumed that four serving cells PCell, SCell1, SCell2 and SCell3 are configured for the user equipment. It may be configured in such a manner that the serving cells SCell2 and SCell3 of which timing alignment features are similar to each other belong to one TAG (that is, TAG3), and the serving cells PCell and SCell1 of which timing alignment features are not similar to each other belong to TAG1 and TAG2, respectively. A separate timing advance value and TAT may be given to each TAG.

In managing uplink timing alignment of the user equipment for which a plurality of serving cells are configured, the following rules may be defined.

One timing reference cell for synchronizing timing alignment may exist in each TAG, and a separate TAT value may be given to each TAG.

Timing alignment maintenance of TAG that includes PCell follows timing alignment maintenance defined in the existing wireless communication system (for example, 3GPP LTE release-10), and the PCell may be a reference cell.

When timing alignment is initially synchronized on the SCell belonging to TAG that does not include PCell, a random access procedure on the corresponding serving cell (that is, SCell) may be performed by only a command of the base station. In other words, even though uplink transmission is required, the random access procedure cannot start on the SCell without a command of the base station.

When timing alignment is synchronized in both the PCell and the SCell through the random access procedure, a non-contention based random access procedure is performed.

If the TAT of the TAG that includes PCell is not operated, the TAT of the other TAGs cannot be operated.

Timing advance of the wireless communication system that supports carrier aggregation may be applied in accordance with the above rules.

In the meantime, in the carrier aggregation system in which a plurality of TAGs are defined and to which a plurality of timing advances are applied, a random access procedure for uplink timing alignment is required for each of the TAGs. In this case, according to the operation defined in the existing wireless communication system, a non-contention based random access procedure for timing alignment maintenance is only supported on the SCell in the TAG that includes SCell only. In other words, in the existing wireless communication system, the non-contention based random access procedure as shown in FIG. 9 has been supported on the SCell.

Advanced Random Access Procedure

According to the non-contention based random access procedure, the base station allocates a random access preamble to the user equipment, and the user equipment uses the corresponding random access preamble for a given time. However, since the number of the random access preambles is limited, if the random access preamble is not sufficient when the non-contention based random access procedure is performed by a plurality of user equipments, a problem occurs in that acquisition and application of a timing advance value may be delayed for some of the user equipments. Accordingly, in order to solve this problem, the present invention suggests a method for supporting a contention based random access procedure, which includes a contention resolution procedure, in a TAG that includes SCell only.

In case that it is simply defined to perform a contention based random access procedure even in a TAG that includes SCell only, a problem occurs in that the contention resolution procedure is not performed normally. In more detail, the existing contention resolution message (for example, S704 of FIG. 8) is received through a PDCCH masked with a user equipment identifier (that is, cell identifier or temporary cell identifier), wherein a PDCCH (for example, PDCCH carrying control information for uplink/downlink data scheduling) of another purpose may be detected on another serving cell (for example, PCell) while the user equipment is trying to receive the contention resolution message on the SCell. In this case, the base station does not transmit a valid contention resolution message but the user equipment may misunderstand the PDCCH of another purpose on another serving cell as the valid contention resolution message and end the random access procedure in error.

Accordingly, the present invention suggests a contention based random access procedure that may be applied to the carrier aggregation system. In particular, the present invention suggests a contention based random access procedure performed on a secondary serving cell (or SCell) if serving cells exceeding one are configured for the user equipment.

If serving cells exceeding one are configured for the user equipment, the user equipment may perform the random access procedure due to some reasons. For example, if uplink data to be transmitted on a first cell exist and uplink timing alignment on the first cell is not synchronized (or in case of various random access events), the random access procedure on the first cell may be performed. In this case, the first cell may be the secondary serving cell (SCell). Also, if the contention based random access procedure is performed, the user equipment may select a random access preamble from a specific set and transmit the selected preamble to the base station on the first cell (transmission of Msg1).

In this regard, the user equipment may receive a random access response message from the base station (reception of Msg2). The serving cell in which the random access response message is received may be the first serving cell. Alternatively, the serving cell in which the random access response message is received may be the serving cell except for the first serving cell. For example, the serving cell in which the random access response message is received may be the serving cell that may detect a PDCCH and receive a PDSCH indicated by the detected PDCCH. For example, the random access response message may be received on the primary serving cell (PCell). This is because that the random access response message transmitted on the PDSCH indicated by the PDCCH may be received on the primary serving cell as a common search space, that is, the location of PDCCH candidates, is defined on the primary serving cell not the first cell.

The user equipment that has received the random access response message may perform uplink data transmission by using an uplink resource corresponding to UL grant included in the random access response message (transmission of Msg3). The uplink data may include the user equipment identifier (for example, cell identifier (C-RNTI) of the first cell). The Msg3 may be transmitted on the primary serving cell or the first serving cell. Whether the Msg3 is transmitted through what serving cell may be determined in accordance with a rule which is previously defined, or may be notified to the user equipment by the base station through higher layer signaling. Also, the user equipment that has transmitted the Msg3 may initiate the contention resolution timer (CR timer).

After the user equipment transmits the Msg3, retransmission of the Msg3 may be performed. The PDCCH that includes UL grant for retransmission of the Msg3 may be transmitted on the primary serving cell from the base station to the user equipment. In this case, the PDCCH may be masked with a temporary user equipment identifier (C-RNTI). The user equipment may transmit the Msg3 to the base station on the primary serving cell or the first serving cell. If the user equipment retransmits the Msg3, the user equipment may resume the CR timer.

The user equipment that has transmitted the Msg3 may try to receive the PDCCH. In other words, the user equipment may try to receive the contention resolution message before the CR timer expires (reception of Msg4). In this case, in order to prevent downlink transmission from being misunderstood by the user equipment as the contention resolution message, the following rules may be applied. For example, if PDCCH transmission addressed to the user equipment's identifier before the CR timer expires exists on the serving cell for scheduling the resource on the first serving cell, the user equipment considers that contention resolution has been performed successfully. In case of the PDCCH received from the other serving cell, the user equipment may consider that contention resolution has not been performed successfully. In this case, PDCCH transmission addressed to the user equipment's identifier means that the PDCCH includes the user equipment's identifier or is masked with the user equipment's identifier.

For example, if the serving cell to which the PDCCH for scheduling uplink/downlink transmission resources on the first serving cell is transmitted is the first serving cell (that is, in case of non-cross carrier scheduling), the user equipment may consider that contention resolution has been performed successfully if PDCCH transmission addressed to the user equipment's identifier (for example, cell identifier of the first cell) before the CR timer expires exists on the first serving cell. As a result, the user equipment may consider that the random access procedure has been performed successfully and end the random access procedure.

Alternatively, if the serving cell to which the PDCCH for scheduling uplink/downlink transmission resources on the first serving cell is transmitted is the second serving cell (that is, in case of cross carrier scheduling), the user equipment may consider that contention resolution has been performed successfully and end the random access procedure if PDCCH transmission addressed to the user equipment's identifier (for example, cell identifier of the first cell) before the CR timer expires exists on the second serving cell. The second serving cell may be the primary serving cell. In this case, the base station may notify the user equipment what the second serving is through higher layer signaling (for example, RRC signaling).

Additionally, the PDCCH received as the contention resolution message may be restricted. For example, the PDCCH masked with the user equipment's identifier may be restricted to be recognized as a normal contention resolution message. Also, the PDCCH, which includes UL grant, may be restricted to be recognized as a normal contention resolution message. Also, the PDCCH, which includes UL grant indicating new transmission not retransmission, may be restricted to be recognized as a normal contention resolution message.

Figure 12:
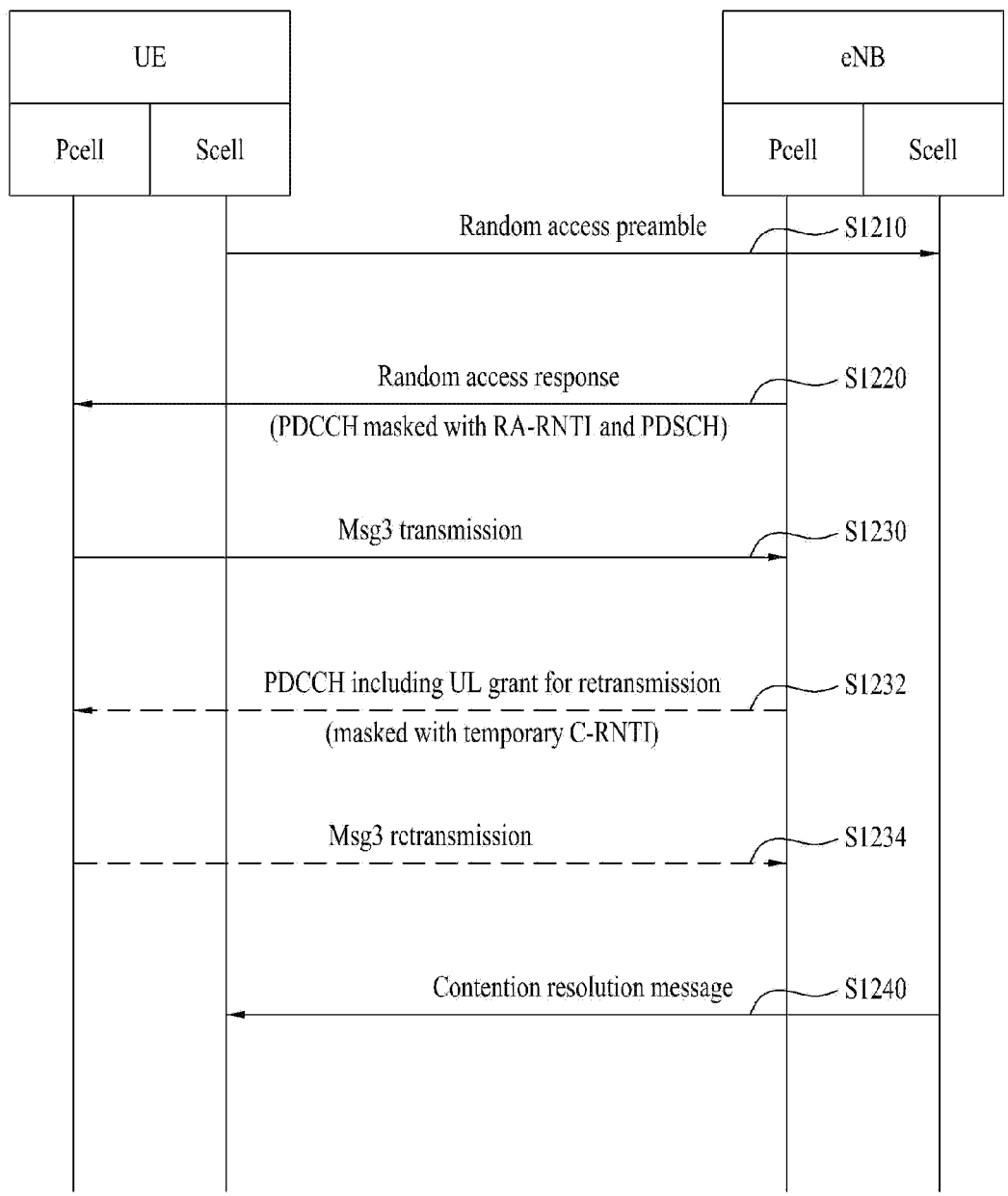
FIG. 12 is a flow chart illustrating an example of the present invention to which cross carrier scheduling is not applied.

FIG. 12 is a flow chart illustrating an example of the present invention to which cross carrier scheduling is not applied. According to the present invention, the contention based random access procedure may be performed on the secondary serving cell SCell.

At step S1210, the user equipment may transmit the contention based random access preamble to the base station on the secondary serving cell SCell. The random access procedure may be performed in case that time synchronization in the secondary serving cell SCell or the TAG, which includes the secondary serving cell, is not performed. However, the scope of the present invention is not limited to the above case, and the principle of the present invention may equally be applied to the random access procedure performed on the secondary serving cell by another reason.

At step S1220, the user equipment may receive the random access response from the base station on the primary serving cell PCell. In this example, although the random access response is received on the primary serving cell, the user equipment may receive the random access response through another serving cell (for example, another secondary serving cell) within the scope of the present invention.

At step S1230, the user equipment may transmit Msg3 to the base station on the primary serving cell by using UL grant included in the random access response. In this example, although the Msg3 is transmitted on the primary serving cell, the user equipment may transmit the Msg3 through the serving cell that has transmitted the random access preamble within the scope of the present invention. The user equipment may transmit the Msg3 and initiate the CR timer.

At steps S1232 and S1234, UL grant for retransmission of the Msg3 is received and the Msg3 is retransmitted. At step S1232, for retransmission of the Msg3, the user equipment may monitor and receive the PDCCH masked with the temporary cell identifier included in the random access response through the primary serving cell (or another serving cell). At step S1234, the Msg3 may be retransmitted through the primary serving cell or the serving cell that has transmitted the random access preamble, similarly to the step S1230. If the user equipment retransmits the Msg3, the user equipment may resume the CR timer. In the meantime, if the user equipment fails to receive the UL grant for retransmission of the Msg3, the steps S1232 and S1234 may not be performed.

At step S1240, if the user equipment receives the PDCCH (that is, contention resolution message) masked with the user equipment's identifier from the base station before the CR timer expires, the user equipment may determine that contention resolution has been completed and end the random access procedure. The contention resolution message may be recognized as the valid contention resolution message only if it is received on a specific serving cell. In this case, the specific serving cell may correspond to the serving cell to which scheduling information on the serving cell (that is, the serving cell that has transmitted the random access preamble) is transmitted.

Since the example of FIG. 12 corresponds to the case where cross carrier scheduling is not applied, resource scheduling information on the serving cell is transmitted on the same serving cell. Accordingly, the contention resolution message may be recognized as the valid contention resolution message if it is received on the serving cell (that is, the serving cell that has transmitted the random access preamble). In the example of FIG. 12, the contention resolution message is received on the SCell, and the user equipment ends the random access procedure.

Figure 13:
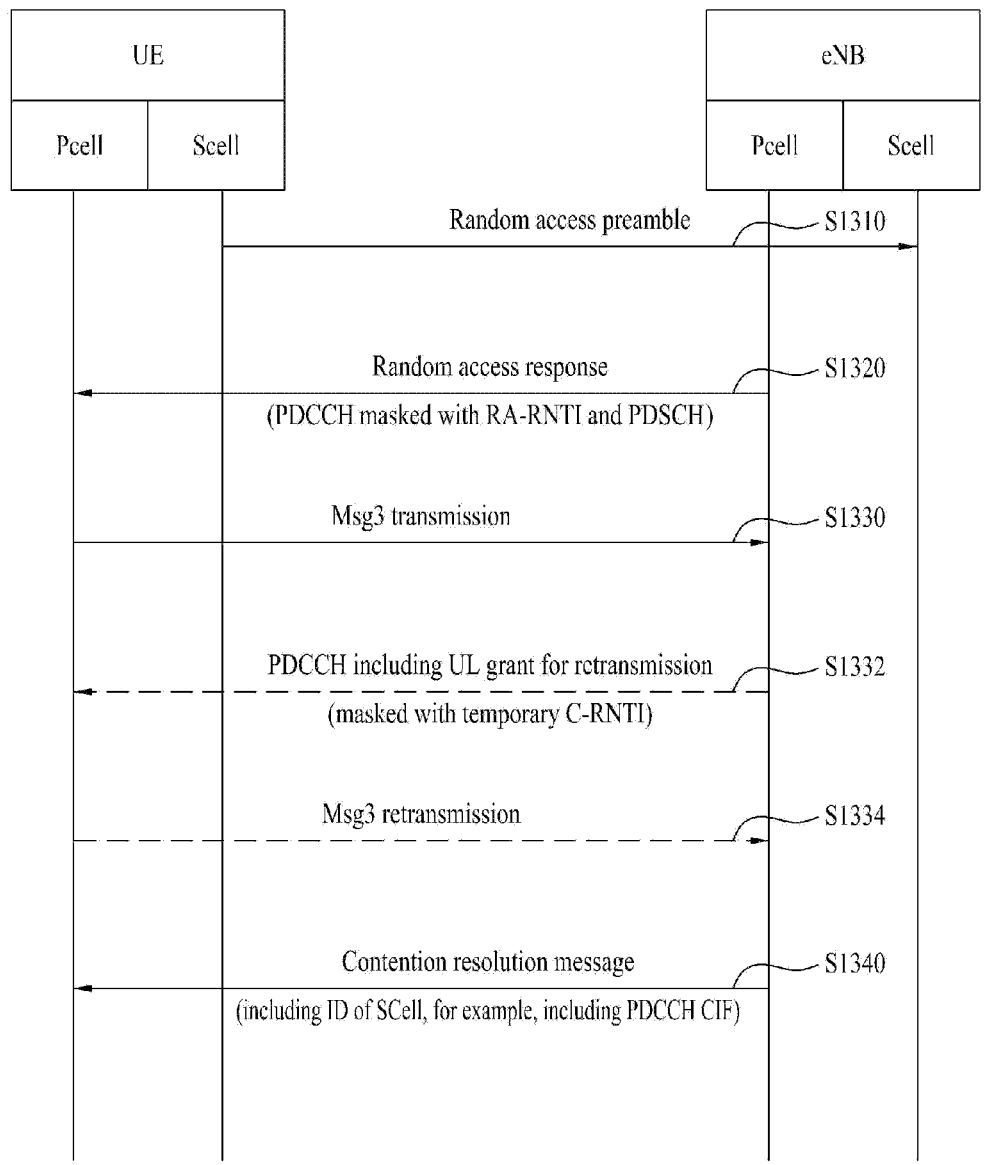
FIGS. 13 and 14 are flow charts illustrating examples of the present invention to which cross carrier scheduling is applied.
Figure 14:
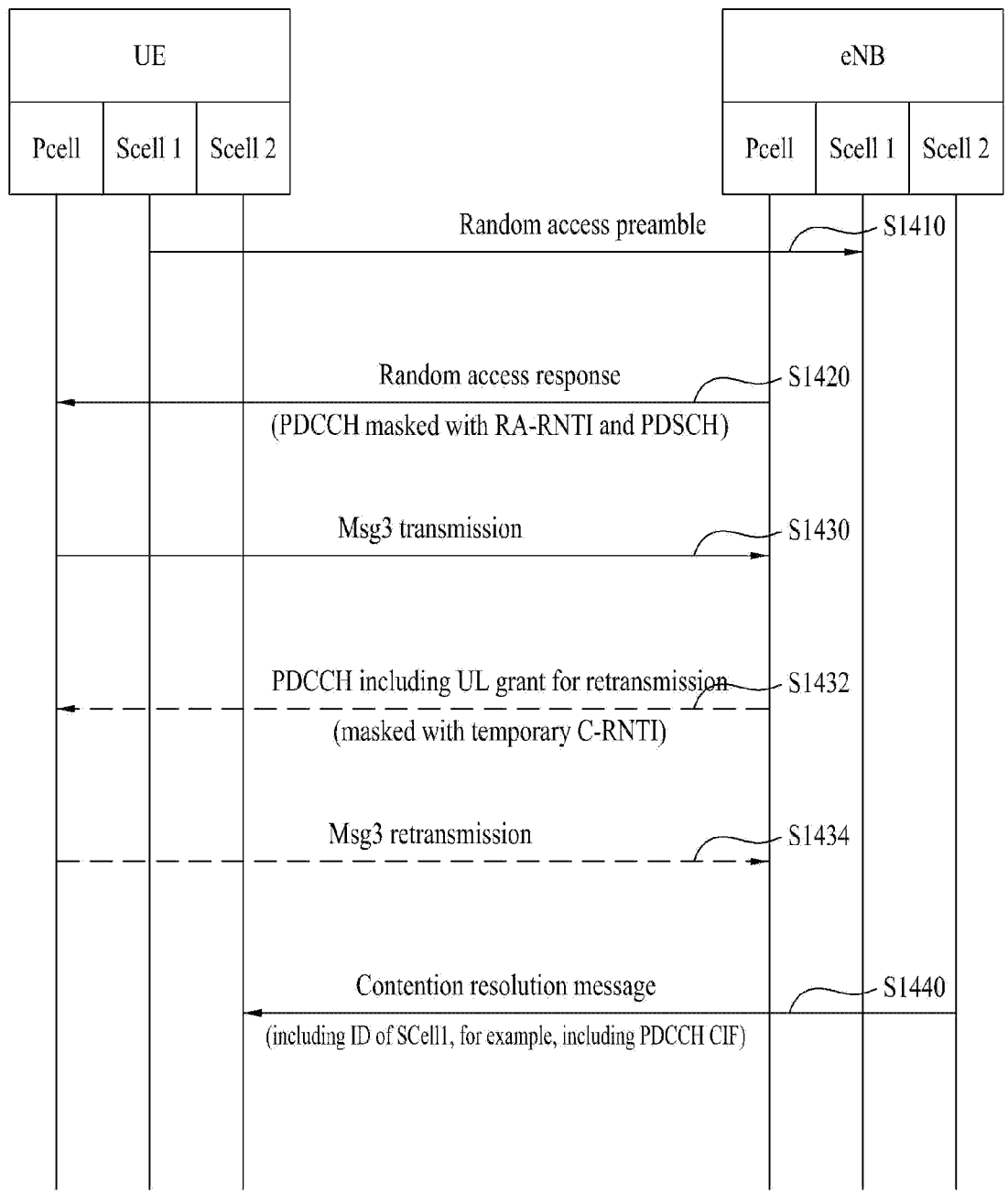

FIGS. 13 and 14 are flow charts illustrating examples of the present invention to which cross carrier scheduling is applied. According to the present invention, the contention based random access procedure may be performed on the secondary serving cell SCell.

In the example of FIG. 13, since steps S1310 to S1334 are substantially identical to the steps S1210 to S1234 of FIG. 12, their repeated description will be omitted.

At step S1340, if the user equipment receives the PDCCH (that is, contention resolution message) masked with the user equipment's identifier from the base station before the CR timer expires, the user equipment may determine that contention resolution has been completed and end the random access procedure. The contention resolution message may be recognized as the valid contention resolution message only if it is received on a specific serving cell (that is, serving cell to which scheduling information on the serving cell that has transmitted the random access preamble is transmitted).

Since the example of FIG. 13 corresponds to the case where cross carrier scheduling is applied, resource scheduling information on the serving cell may be transmitted on another serving cell. In the example of FIG. 13, it is assumed that the scheduling information on the serving cell is transmitted on the primary serving cell. Accordingly, the contention resolution message may include an identifier on the serving cell to which the random access preamble is transmitted, and may be recognized as the valid contention resolution message if it is received on the primary serving cell. In the example of FIG. 13, the contention resolution message, which includes the identifier of the SCell, is received on the PCell, and the user equipment ends the random access procedure.

In the meantime, in the example of FIG. 14, three serving cells are configured for the user equipment, and it is assumed that the user equipment performs the random access procedure on the SCell. In the example of FIG. 14, since steps S1410 to S1434 are substantially identical to the steps S1210 to S1234 of FIG. 12, their repeated description will be omitted.

The example of FIG. 14 corresponds to the case where cross carrier scheduling is applied, and it is assumed that resource scheduling information on SCell1 is transmitted on SCell2. Accordingly, the contention resolution message may include an identifier on the serving cell (that is, SCell1) to which the random access preamble is transmitted, and may be recognized as the valid contention resolution message if it is received on the SCell2 for scheduling the SCell1. In the example of FIG. 14, the contention resolution message, which includes the identifier of the SCell1, is received on the SCell2, and the user equipment ends the random access procedure.

According to the present invention as described above, if the contention based random access procedure is performed of uplink time synchronization on the secondary serving cell, the contention resolution message may be restricted as the PDCCH received on the specific serving cell, whereby an error that may occur during the contention resolution procedure may be avoided. As a result, delay time for reconfiguration of time synchronization may be reduced. In this case, the specific serving cell is the serving cell to which the scheduling information on the serving cell where the random access procedure is performed is transmitted. Also, the specific serving cell may be the same serving cell, to which the scheduling information on the serving cell where the random access procedure is performed is transmitted, if cross carrier scheduling is not applied, or may be another serving cell (primary serving cell or another secondary serving cell) if not so.

The aforementioned various embodiments of the present invention may independently be applied to the aforementioned random access operation of the present invention, or two or more embodiments may simultaneously be applied to the aforementioned random access operation, and repeated description will be omitted for clarification.

Figure 15:
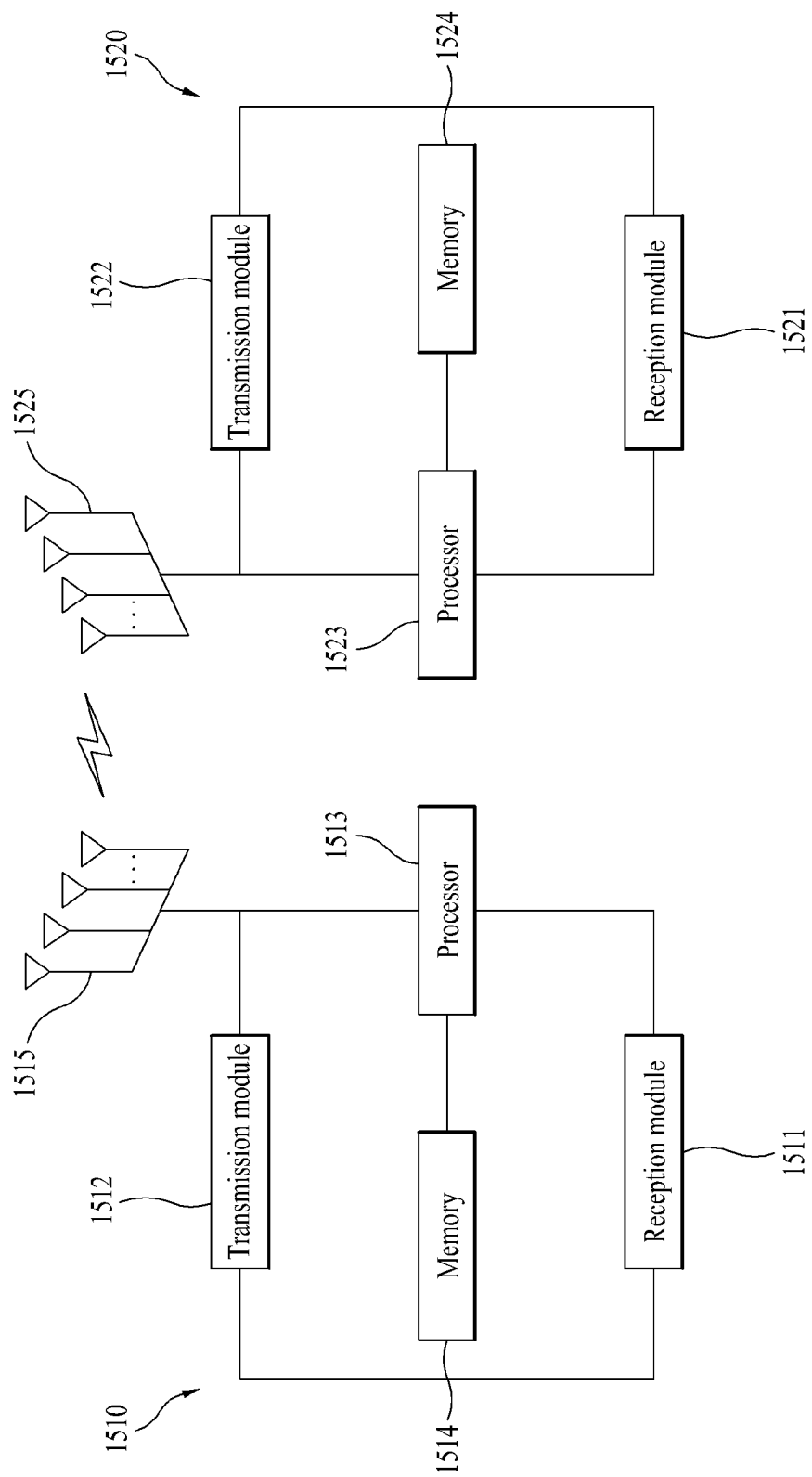
FIG. 15 is a diagram illustrating a preferred embodiment of a base station 1510 and a user equipment 1520 according to the present invention.

FIG. 15 is a diagram illustrating a preferred embodiment of a base station 1510 and a user equipment 1520 according to the present invention.

Referring to FIG. 15, the base station 1510 of the present invention may include reception module 1511, a transmission module 1512, a processor 1513, a memory 1514, and a plurality of antennas 1515. The plurality of antennas 1515 mean the base station that supports MIMO transmission and reception. The reception module 1511 may receive various kinds of signals, data and information on an uplink from the user equipment. The transmission module 1512 may transmit various kinds of signal, data and information on a downlink to the user equipment. The processor 1513 may control the overall operation of the base station 1510.

The base station 1510 according to one embodiment of the present invention may be configured to support the random access procedure of the user equipment on the secondary serving cell if a plurality of serving cells are configured for the user equipment. The processor 1513 of the base station 1510 may be configured to receive the random access preamble from the user equipment on the first SCell through the reception module. Also, the processor 1513 may be configured to transmit the random access response to the user equipment through the transmission module. Also, the processor 1513 may be configured to receive uplink data transmitted from the user equipment through the reception module by using uplink grant included in the random access response. Also, the processor 1513 may be configured to transmit the contention resolution message to the user equipment through the transmission module on the serving cell to which scheduling information on the first SCell is transmitted.

In addition, the processor 1513 of the base station 1510 performs an operation for information received by the base station 1510, information to be transmitted to the outside, etc., and the memory 1514 may store the operation processed information for a predetermined time and may be replaced with an element such as a buffer (not shown).

Referring to FIG. 15, the user equipment 1520 of the present invention may include reception module 1521, a transmission module 1522, a processor 1523, a memory 1524, and a plurality of antennas 1525. The plurality of antennas 1525 mean the user equipment that supports MIMO transmission and reception. The reception module 1521 may receive various kinds of signals, data and information on a downlink from the base station. The transmission module 1522 may transmit various kinds of signal, data and information on an uplink to the base station. The processor 1523 may control the overall operation of the user equipment 1520.

The user equipment 1520 according to one embodiment of the present invention may be configured to perform the random access procedure on the secondary serving cell if a plurality of serving cells are configured for the user equipment. The processor 1523 of the user equipment 1520 may be configured to transmit the random access preamble to the base station on the first SCell through the transmission module. Also, the processor 1523 may be configured to receive the random access response from the base station through the reception module. Also, the processor 1523 may be configured to transmit uplink data to the base station through the transmission module by using uplink grant included in the random access response. Also, the processor 1523 may be configured to receive the contention resolution message from the base station through the reception module on the serving cell to which scheduling information on the first SCell is transmitted.

In addition, the processor 1523 of the user equipment 1520 performs an operation for information received by the user equipment 1520, information to be transmitted to the outside, etc., and the memory 1524 may store the operation processed information for a predetermined time and may be replaced with an element such as a buffer (not shown).

The details of the aforementioned base station and the aforementioned user equipment may be configured in such a manner that the aforementioned various embodiments of the present invention may independently be applied to the aforementioned base station and the aforementioned user equipment, or two or more embodiments may simultaneously be applied to the aforementioned base station and the aforementioned user equipment, and repeated description will be omitted for clarification.

Also, in the description of FIG. 15, the description of the base station 1510 may equally be applied to a relay station as a downlink transmission entity or an uplink reception entity, and the description of the user equipment 1520 may equally be applied to a relay station as a downlink reception entity or an uplink transmission entity.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

The invention claimed is:

1. A method for performing a random access procedure on a first secondary serving cell (SCell) in a user equipment comprising a plurality of serving cells, the method comprising:
    transmitting a random access preamble on the first SCell to a base station;
    receiving a random access response on a primary serving cell (PCell) from the base station;
    transmitting uplink data to the base station on the PCell by using an uplink grant included in the random access response; and
    receiving a contention resolution message from the base station on the first SCell, on which scheduling information on the first SCell is transmitted,
    wherein the user equipment determines that contention resolution is successful only if physical downlink control channel (PDCCH) transmission is received on the first SCell, on which the scheduling information on the first SCell is transmitted,
    wherein the user equipment determines that contention resolution is not successful if PDCCH transmission is received on a serving cell other than the first SCell among the plurality of serving cells,
    wherein an identifier of the user equipment includes a cell-radio network temporary identifier (C-RNTI) or a temporary C-RNTI, and
    wherein the first SCell belongs to a timing advance group (TAG) that includes SCells only, the SCells being from the base station and from neighboring base stations.

2. The method according to claim 1, wherein the physical downlink control channel (PDCCH) transmission is addressed by the identifier of the user equipment.

3. The method according to claim 1, wherein the physical downlink control channel (PDCCH) transmission includes the uplink grant.

4. The method according to claim 1, wherein the user equipment initiates a contention resolution timer if the uplink data is transmitted.

5. The method according to claim 1, wherein the contention resolution message is received before a contention resolution timer expires.

6. The method according to claim 1, wherein the user equipment that has received the contention resolution message determines that the random access procedure is successful.

7. A user equipment for performing a random access procedure on a first secondary serving cell (SCell) the user equipment comprising:
    a reception module configured to receive a downlink signal from a base station;
    a transmission module configured to transmit an uplink signal to the base station; and
    a processor configured to control the user equipment that includes the reception module and the transmission module,
    wherein a plurality of serving cells are configured for the user equipment, and
    wherein the processor is further configured to:
        transmit a random access preamble on the first SCell to the base station through the transmission module,
        receive a random access response on a primary serving cell (PCell) from the base station through the reception module,
        transmit uplink data to the base station on the PCell by using an uplink grant included in the random access response through the transmission module, and
        receive a contention resolution message from the base station on the first SCell, on which scheduling information on the first SCell is transmitted, through the reception module,
    wherein the user equipment determines that contention resolution is successful only if physical downlink control channel (PDCCH) transmission is received on the first SCell, on which the scheduling information on the first SCell is transmitted,
    wherein the user equipment determines that contention resolution is not successful if PDCCH transmission is received on a serving cell other than the first SCell among the plurality of serving cells,
    wherein an identifier of the user equipment includes a cell-radio network temporary identifier (C-RNTI) or a temporary C-RNTI, and
    wherein the first SCell belongs to a timing advance group (TAG) that includes SCells only, the SCells being from the base station and from neighboring base stations.

* * * * *